Figure 1:
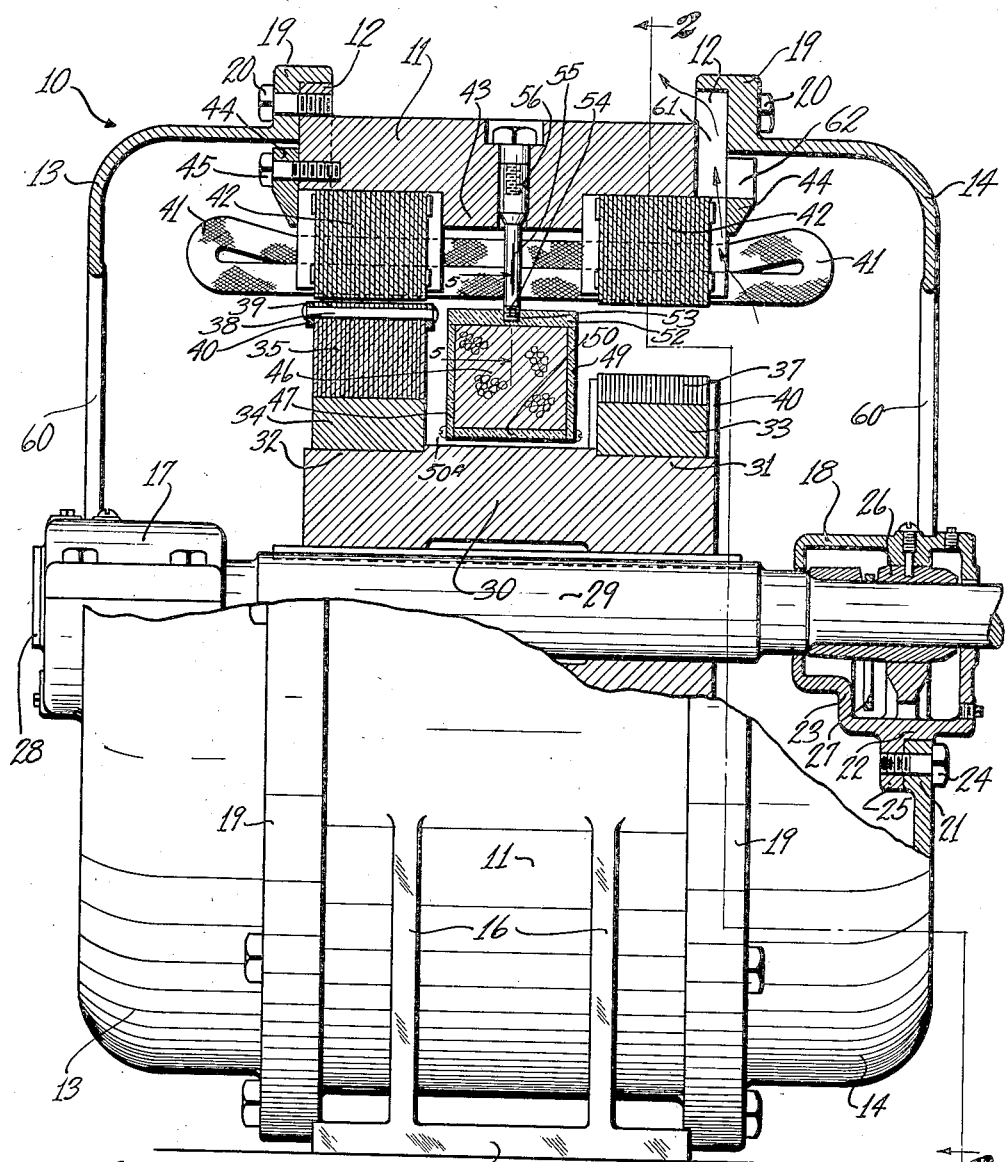

March 16, 1937. T. SCHOU 2,073,760
SYNCHRONOUS MACHINE
Filed March 23, 1933 3 Sheets-Sheet 1

INVENTOR.
THEODOR SCHOU
BY
ATTORNEY.

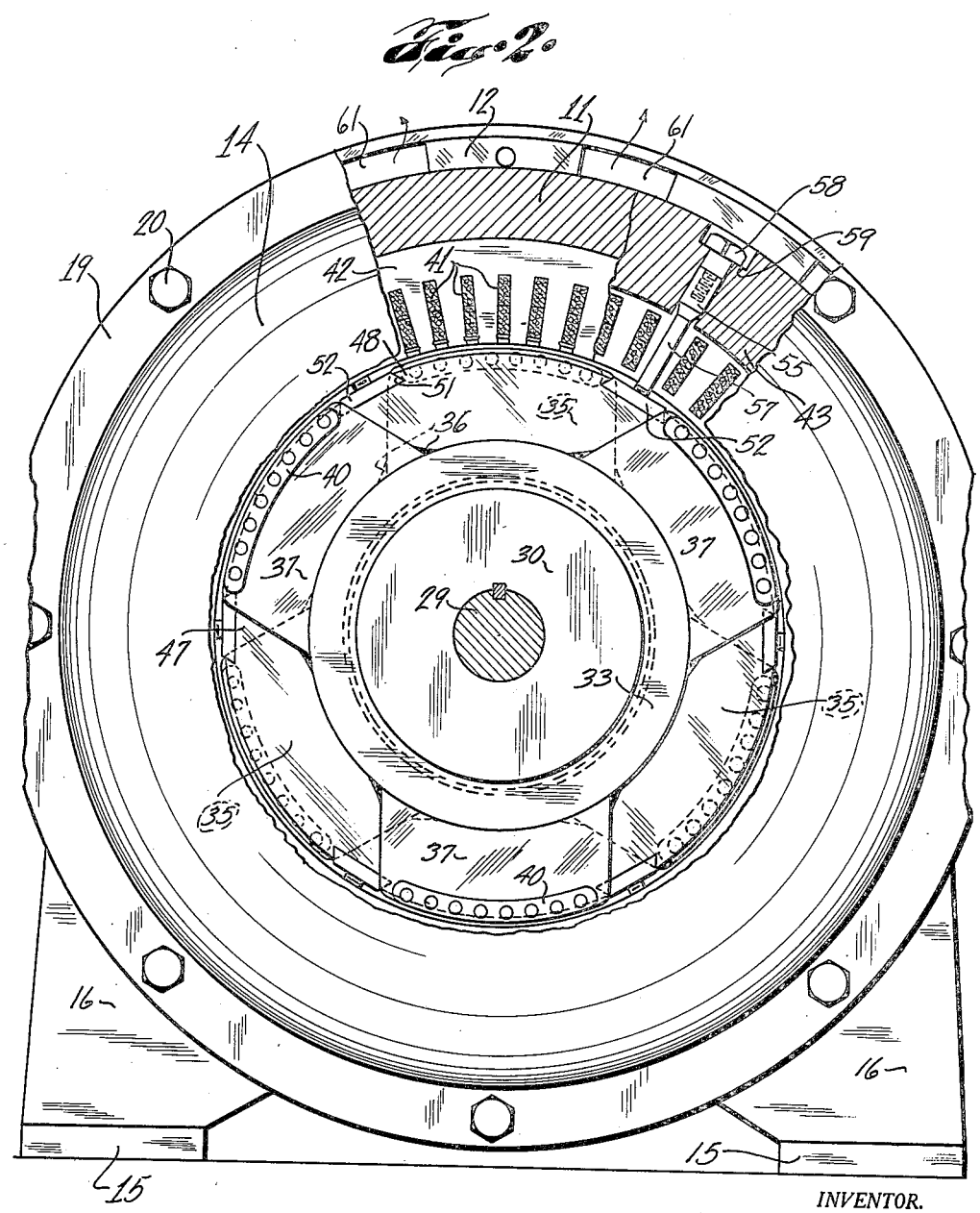

INVENTOR.
THEODOR SCHOU
BY
ATTORNEY.

Patented Mar. 16, 1937

2,073,760

UNITED STATES PATENT OFFICE 2,073,760

SYNCHRONOUS MACHINE

Theoder Schou, Beloit, Wis., assignor to Fairbanks, Morse & Company, Chicago, Ill., a corporation of Illinois Application March 23, 1933, Serial No. 662,210

12 Claims. (Cl. 171—252)

This invention relates to improvements in synchronous machines, and more particularly to an improved synchronous machine of so-called inductor type.

An inductor type of synchronous machine, having its armature and field excitation windings stationary, embodies certain desirable features which are not present in the usual forms of synchronous machines. For example, such machine elements as slip rings, brushes, and brush connectors or leads, all of which are essential parts of machines having rotating windings, are entirely eliminated in inductor machines. Hence an inductor type synchronous machine is readily adaptable to a compact construction, and, since there are no rotating windings, its machine elements may be constructed and assembled for relatively high speed operation, where such speeds are required. However, there have heretofore existed certain undesirable operating characteristics of machines of this type, which have caused the inductor machine to be discarded as an impractical and inefficient power device. For instance, a characteristic feature of operation of the inductor type machine is the relatively high flux density in its magnetic circuit. The usual result of operating an electrical machine at high flux densities, is a large magnetic leakage loss, which, as is well known, materially reduces the general efficiency of the machine as an energy translating device. Furthermore, a high magnetic leakage usually results in a defective voltage regulation, which directly affects stability of machine operation. Many of the attempts which have been made heretofore, to insure a reduction in the magnetic leakage and to increase efficiency of operation, have only resulted in heavy and costly machines.

Among such unsatisfactory attempts to reduce magnetic leakage may be noted many unusual arrangements of windings, in most instances requiring additional space, mounting expedients, etc., thus adding materially to the production cost of the machine and in many instances adding to its space requirements. The trend of other attempts is exemplified by the use, in certain other types of machines, of non-ferrous or non-magnetic materials at certain isolated locations within the machine in an attempt to interrupt or reduce the section of leakage paths otherwise existing. Since it has been only recently that relatively non-magnetic ferrous materials have become commercially available, and have been so developed as to possess requisite resistance to shearing and bending stresses without displaying undue brittleness, it will appear obvious why the manifold earlier attempts to overcome the present problem, were without success. It may be noted that the use of such materials and equivalent non-ferrous metals, adds greatly to the cost of machines of the present order as compared to constructions entirely of ferrous materials.

It is, therefore, an object of the present invention to provide an improved synchronous machine of inductor type which is adapted, through certain innovations in the formation, assembly and choice of materials of its several parts, to overcome the above noted objections to its use.

A more specific object is to provide a machine of the present type in which certain of its parts are formed of a non-magnetic material or materials, to reduce magnetic leakage losses, and thereby to increase the operating efficiency of the machine.

Another object is to provide a synchronous machine of inductor type in which the field excitation winding is arranged adjacent the rotor member, thereby effecting a reduction in the size and diameter of the winding coil, and a saving in the amount of copper employed in its formation.

A further object is attained in the provision of an improved inductor synchronous machine in which the field winding is secured within an insulating case adjacent the machine rotor member, the case being held in position by a series of insulated mounting studs extending inwardly from the stationary armature frame.

A still further object is attained in the provision of an induction type synchronous machine, of a rugged and compact construction, in which certain of its parts are assembled in an economical manner by the use of threadless pins or bolts, and by welding, thus making for a considerable reduction in production costs, through savings in both labor and materials.

Figure 5:
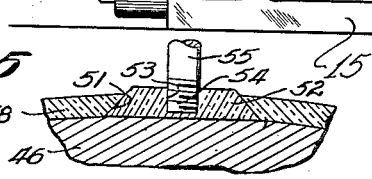
Figure 3:
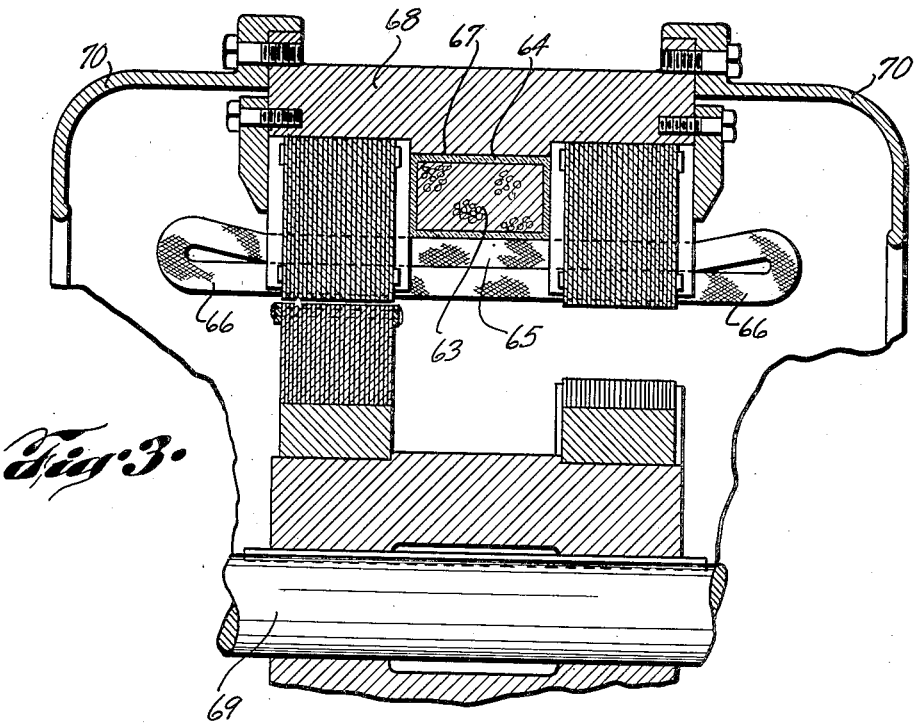
Figure 4:
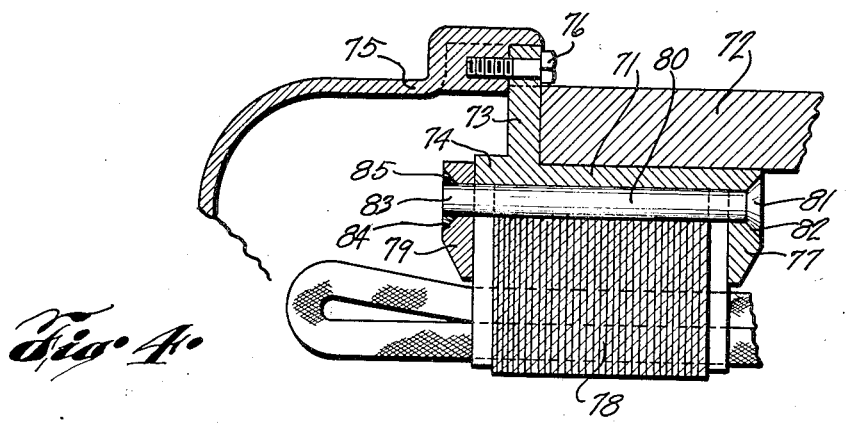

Further objects and advantages will appear from the following description, and from the drawings, in which:

Fig. 1 is a longitudinal elevation, partly in section, of an improved inductor type synchronous machine; Fig. 2 is an end elevation thereof, with certain portions shown in section, as taken along line 2—2 in Fig. 1; Fig. 3 is a fragmentary sectional elevation of a modified form of the machine; Fig. 4 is a fragmentary sectional elevation of the stator portion of the machine, showing improved assembly details, and Fig. 5 is a fragmentary side elevation, along line 5—5 of Fig. 1, illustrating a preferred manner of mounting the field windings.

Referring now to the drawings by characters of reference, 10 designates, generally, a preferred form of synchronous machine of the inductor type, embodying improved features presently to be described. The stationary part or stator of the machine includes an annular magnetic frame or armature ring member 11, having a laterally extending, circumferential flange 12 on each end, and end arms or bearing brackets 13 and 14. The machine is mounted upon a suitable base (not shown) by means of supporting members or feet 15 which are secured to the machine by arms or webs 16, the arms being preferably formed integrally with the frame 11. The frame 11, supporting feet 15, and webs 16 are preferably cast as a single unit, although the feet and webs may be formed as separate members, and secured to the frame by any suitable means, such as, for example, bolting or welding (not shown). The bearing brackets 13 and 14, and their respective bearing assemblies 17 and 18, are preferably alike in every respect, hence only one of the brackets and bearing assemblies will be described in detail. The bracket 14 is provided with an outwardly extending annular flanged shoulder 19 which engages one of the flanges 12 on the frame 11, and a portion of the frame, substantially as shown in Fig. 1. The flange 12 is drilled and tapped at spaced intervals to receive threaded ends of bolts 20 which are provided to secure the arm 14 to the frame 11. The brackets are preferably aluminum alloy castings, alloys of aluminum and copper and/or zinc being suitable because of their non-magnetic properties. However, any other economical, non-magnetic metal, suitable for the purpose, may be substituted. The bracket is provided with a central arcuate seat 21 adapted to receive thereupon a flanged shoulder portion 22 of a bearing housing 23, the housing being secured upon the seat 21 by bolts 24 extending through the seat portion and into the flange 25 of the housing shoulder portion 22. The bearing assembly 18 includes, within the housing 23, a bearing shell 26 and an oil feeder ring 27, both of non-magnetic material, such as brass. The material of the housing 23 is preferably an aluminum alloy, as is the cap 28 on the bearing housing 17. The bearings 17 and 18 are provided for a rotor shaft 29 which is preferably formed from a non-magnetic material, such as stainless steel or other similar alloy of low permeability. The arrangement of the several parts composing the bearing assembly 18 is conventional, and forms no part of the present invention. However, the material of the parts of the bearing assembly, shaft, and bearing brackets becomes of prime importance where high magnetic losses are encountered. As has been stated before, the synchronous machines of inductor type employed heretofore have been regarded with disfavor, as inefficient energy translating devices, due to large magnetic leakage losses, principally through magnetic bearing brackets, bearings and shafts, and the coupling members of connecting shafts operating other machines. Hence, in order to reduce the magnetic losses, such machine elements are preferably formed of non-magnetic material.

A field core or spider member 30, which may be a steel casting, is keyed to the shaft 29, and has its ends 31 and 32 reduced in diameter to receive, respectively, inductor field rings 33 and 34 which may be shrunk onto the spider ends, or otherwise secured to the core member. Laminated field pole structures 35 are spaced equally about the circumferential surface of the ring 34, and are secured thereto preferably by welding, as at 36, (Fig. 2). An equal number of pole structures 37 are secured in spaced relation upon the ring 33. In order to obtain certain operational advantages, particularly that of mechanical balance, the poles 35 are laterally shifted with respect to the poles 37, as clearly illustrated in Fig. 2, thereby providing a longitudinally staggered relation of the poles. An amortisseur or damper winding, being a synchronous machine starting expedient well known in the art, is provided in the end portions of each of the poles 35 and 37. Each of these windings includes a series of damper bars 38, in suitable slots or apertures 39 through the end portions of the associated pole structure, and end connector bars 40 short circuiting the damper bars.

An armature winding 41 and laminated armature core structures 42, within the armature frame 11, are formed and assembled in a manner well known to those familiar with synchronous machine construction. As shown in Fig. 1, the inner end portion of each core structure 42 abuts an inwardly extending, annular spacing flange 43, preferably formed integrally with the frame member 11. Each of the core rings is maintained in assembly position within the frame 11, by an armature follower-ring or clamping member 44 which may be secured to the frame by any suitable means, such as bolts 45.

The field pole magnets are excited by a field coil winding 46 disposed within an annular case structure 47. The case and winding are positioned between the field rings 33 and 34, and adjacently surround the spider member 30. Mounting the field winding adjacent the rotor spider member decreases the average diameter of the winding coils, and hence decreases the amount of copper employed in the winding. The field coil case is stationary, and is secured to the frame 11 in a manner which will presently be described. The case comprises a top 48, side portions 49, and a bottom cover 50 detachable upon removal of the screws 50A, the several parts thereof being composed of an insulating material, such as micarta. A portion of the top 48 is cut away, as at 51, (Figs. 2 and 5), in spaced intervals about the periphery of the case, to receive removable wedge-shaped members 52 which may be of the same material as the case. Each of the wedge members is centrally drilled and tapped, as at 53, to receive the threaded end 54 of a mounting stud 55. The mounting studs are secured in suitable apertures 56 radially extending through the central portion of the frame 11, the apertures being peripherally spaced to correspond to the spacing of the wedges 52 in the case structure 47. The studs are each composed of an insulating stem or shank portion 57, which may be formed from fiber or any other suitable insulator material, and a metal head portion 58. The head portion may consist of a bolt secured within a threaded aperture in the upper end of the fiber stem 57. As illustrated in Figs. 1 and 2, the aperture 56 is countersunk or enlarged near its upper end to form an annular shoulder 59 which serves as a seat for the several head portions 58 of the stud members 55.

It will appear from Figs. 1 and 5 that, upon unthreading the elements 56, the case structure 47 will be loosened within the frame, and the wedges 52 will be loosened in the top 48 of the case, whereupon the coil and case assembly may be withdrawn in an axial direction incident to endwise removal of the rotor.

Cooling air may be drawn in through air ports 60 in the bearing brackets, by suitable fan blades (not shown) on the rotor structure, or by the fan blade action of the rotating field poles 35 and 37. In the present example, the cooling air is preferably expelled through air exit ducts 61 in end portions of the frame member 11. The clamping rings 44 are provided with slots 62 which are arranged to register, in assembly, with the inner ends of the ducts 61, thereby completing the air exit passages.

Fig. 3 illustrates a modification in the arrangement and position of the field winding as shown in Fig. 1. In the modification, the field winding 63 and winding case 64 are secured between the central portion 65 of the armature winding 66, and the surface of the armature core spacing flange 67 extending inwardly of the frame 68. The frame 68, rotor shaft 69, bearing bracket 70, and other parts of the machine of Fig. 3 may be of the same or similar construction and material as that employed in the machine shown in Figs. 1 and 2.

Fig. 4 illustrates a modification in the manner of securing the stationary armature core structures to the machine frame. The securing means shown and presently to be described, is particularly adapted to large machines wherein the armature core structure is composed of a plurality of individual arcuate sections, rather than a one-piece core of a plurality of laminated rings in compressed relation, as shown in Fig. 2. However, it is to be understood that the securing means presently to be described may be applied as well to one piece core members, such as the core members 42 in Fig. 1. A frame member or core supporting bracket 71, which may be of cylindrical form, adapted to seat within the armature frame 72 which corresponds to the frame 11 in Fig. 1, is provided with an outwardly extending mounting flange 73 adjacent its outermost end 74. The flange 73 is positioned between the armature frame 72 and a bearing bracket 75, and is secured to the bearing bracket as by a bolt 76. An inwardly extending flange 77 on the inner end of the member 71, is provided as a clamping shoulder for one side of an armature core structure 78. The opposite side of the core structure is engaged by a clamping ring 79, the clamping ring also abutting the end 74 of the frame 71. The core member 78 is bound between the shoulder 77 and the ring 79, the several members being maintained in assembly by tie bars 80, each having a head portion 81 seated in a countersunk aperture 82 through a portion of the shoulder 77. The opposite end 83 of each bar extends through a similarly countersunk aperture 84 in the ring member 79. The stud or bar end 83 is secured to the ring by any suitable means such as, for example, welding, as at 85 (Fig. 4).

The present improvements in a synchronous machine of inductor type, as fully described hereinabove, results in a machine having greatly improved operating characteristics. The use of non-magnetic material for the rotor shaft, bearing brackets, and bearings, aids materially in decreasing the magnetic losses which have heretofore contributed in making a machine of this type impractical and inefficient as a power device, serving completely to overcome the several objections formerly prevailing, and realizing fully the several objects above appearing.

While I have described as a constructional preference, an electrical machine in which, as disclosed, three of the elements are of non-magnetic construction, viz., the shaft, the bearings and the bearing arms or end bells, it will be understood that non-magnetic materials or metals may be employed selectively, within the present invention, for the several items of structure. For example, in machines of certain types, a clear advantage is derived from the use of a non-magnetic shaft, such as stainless steel, without necessarily employing other than the ordinary magnetic materials for both the bearing arms and bearings.

In like manner the arms alone may be formed of non-magnetic material, and I reserve the right, within the appended claims, to protection on the several sub-combinations within the purview of the present disclosure.

The invention has been described by means of a detailed description of an inductor type synchronous machine. However, in view of the present teachings, it will be apparent that in numerous other types of electric machines, certain of the parts may be advantageously made up of non-magnetic metal, and hence I do not wish to be restricted, as to application, of the principles of the invention, to their use in an inductor type synchronous machine.

It is to be understood that the invention is not limited by the specific forms of the presently described embodiments, as they may be altered or modified without departing from the spirit and full intended scope of the invention, as defined by the appended claims.

I claim:

1. In an electrical machine, means for mounting a laminated core to a frame or support, said means including an angulate mounting element adapted laterally to engage the core and the frame or support, a core clamping element, and a plurality of bars extending through and projecting beyond the laminations of the core, and adapted to secure the angulate mounting element and core clamping element in assembly with the core, said bars each having an expanded head portion recessed in portions of one of said elements, and each having its free end welded to the other of said elements.

2. In an electric machine, a laminated core structure, means for securing the laminated structure to a support within the machine, said securing means including an angulate core supporting bracket to which the core laminations are edgewise presented, clamping elements disposed at the opposite ends of the stack of laminations of the core, one of said clamping elements being carried by the bracket, the clamping elements and laminations being provided with registering apertures, a plurality of tie bars extending through said apertures, the apertures in said clamping elements being countersunk near their outer margins, each of said bars having an extended head portion in the countersunk aperture of one of the clamping elements, and having a free end welded in place in the aperture of the opposite clamping element.

3. In a synchronous machine of inductor type, a stationary frame, an armature core, an angulate mounting member for said core, said mounting member engaging and extending within said frame, a core-clamping member, and a plurality of bars securing said clamping member, core and mounting member in assembly, said bars having expanded head portions secured in portions of the mounting member, and each having its free end welded to said clamping member.

4. In an electric machine, a field winding, a support therefor, a case for the field winding formed of semi-rigid insulating substance, a plurality of members by which the case is detachably positioned with respect to said support, and a slidable connection from each of said positioning members to said case.

5. In an electrical machine of a type employing a stationary field winding, a field structure including a coil, a case, a plurality of mounting studs slidably and detachably connected to said case in supporting relation, each of said studs including a metallic head portion adapted to be extended through a frame or like supporting portion of the machine, and a non-magnetic portion intervening the head portion and said case.

6. In a synchronous machine of inductor type, a stationary frame, an armature winding carried by the frame, an inductor field rotor including a non-magnetic steel shaft, bearing brackets for said rotor and a stationary field winding structure including a field coil, an insulated case, and a plurality of mounting elements, said mounting elements projecting inwardly of said stationary frame, and means on the inner ends of said elements slidably engaging said case in supporting relation therewith, portions of said elements adjacent said case, being of a non-magnetic insulating material.

7. In a synchronous machine of inductor type, a stationary armature and supporting frame, a field rotor, bearing brackets for said rotor, said brackets being formed of non-magnetic aluminum alloy, and a stationary field winding structure including a field coil, case, and a plurality of mounting studs, said studs extending inwardly from said frame and a wedge element on the inner end of each stud, slidably engaging said coil case in holding relation therewith, each of said studs being composed of a metallic head portion and a non-magnetic shank portion.

8. In a synchronous machine of inductor type including a stationary frame, an armature structure within said frame, a field winding, an inductor rotor characterized by spaced inductor elements, the field, armature and inductor elements being so related as to tend to define a major leakage flux path along the axis of the rotor, a non-magnetic stainless steel shaft, a non-magnetic aluminum alloy bearing arm on each end of the frame, and a non-magnetic bearing assembly including a non-magnetic bearing housing, disposed centrally of each of said bearing arms.

9. In a synchronous machine, a stationary frame, an armature winding carried by said frame, a field winding also positioned with said frame, non-metallic elements through which the field winding is spaced inwardly of the frame, a rotor including a shaft of non-magnetic ferrous metal, inductor pole elements carried by said rotor, bearing brackets formed of an aluminum alloy and carried by the frame, a bearing structure on each bearing bracket and formed of a non-magnetic alloy, the field, armature and inductor elements being related so as to tend to define a major leakage flux path along the axis of the rotor and through the bearings and bearing brackets.

10. In a synchronous machine, a stationary frame, a stationary armature structure and field winding carried by the frame, a rotor within the frame, the armature structure including an annular, slotted, laminated armature core and windings in the slots thereof, an annular housing for the field winding, means including non-metallic supporting pieces, through which the field winding is assembled in the frame, a plurality of groups of magnetically interconnected inductors on said rotor operable in adjacent but axially spaced relation to the field winding, a rotor shaft of non-magnetic ferrous metal, bearing brackets carried by the frame, a bearing assembly for said shaft carried by each bearing bracket, the bearing assemblies and bearing brackets each being formed of a non-magnetic alloy, the inductor pole pieces and elements of the armature and field windings being relatively so disposed as to tend to define a major leakage flux path along said shaft and in the regions of the bearing assemblies and bearing arms.

11. In a synchronous machine, a stationary frame, an armature structure and field windings carried by said frame, the armature structure including a slotted annular armature core, and armature windings in the slots thereof, an enclosure for the field winding, elements of non-magnetic material intervening the enclosure and the frame, and through which the field winding is supported, a rotor embodying spaced groups of inductor pole pieces, laterally adjacent, but axially spaced from the field winding, means magnetically bridging the pole pieces of the adjacent groups, the elements of the armature, field winding and frame being structurally and operatively related in a manner tending to define a path of leakage flux concentrated axially of the machine, a rotor shaft of stainless steel, shaft bearings of a non-magnetic alloy, housings, for said bearings formed of an aluminum alloy, and bearing brackets serving to carry the housings, said brackets being formed of an aluminum alloy.

12. In a synchronous machine of inductor type, a stationary frame, a stationary armature structure within said frame, including an annular, laminated armature core, characterized by slots and including windings in the slots, a field winding, an enclosure for the field winding, elements of non-magnetic material intervening the enclosure and the frame, an inductor rotor including a non-magnetic, stainless steel shaft, a non-magnetic aluminum alloy bearing arm on each end of said frame, and a non-magnetic bearing assembly centrally of each of said arms, each bearing assembly including a non-magnetic aluminum alloy housing and non-magnetic journal box elements engaging the shaft, said non-magnetic bearing arms, bearing assemblies and bearing housings being disposed in the path of maximum magnetic leakage of the machine, and constituting an uninterrupted leakage path of maximum reluctance.

THEODOR SCHOU.